Patented Sept. 8, 1931

1,822,254

UNITED STATES PATENT OFFICE

FERNANDO SOMOZA VIVAS, OF NEW YORK, N. Y., ASSIGNOR TO INTERNATIONAL FIREPROOF PRODUCTS CORPORATION, OF NEW YORK, N. Y., A CORPORATION OF DELAWARE

NONEXPLOSIVE, NONINFLAMMABLE SOLUBLE COTTON AND PROCESS OF PRODUCING THE SAME

No Drawing. Application filed October 8, 1927. Serial No. 225,036.

Nitrocellulose, gun cotton, or "soluble cotton" is well known to be an explosive, exceedingly inflammable material and has many industrial uses aside from the preparation of explosives. Because of its hazardous character United States Government regulations do not permit common carriers to transport the material in a dry condition and industries using the material are subject to great hazards of life and property.

It is an object of the present invention to provide a soluble cotton that is totally non-explosive and non-inflammable or exceedingly fire resistant and which is still capable of use in all or substantially all of the usual industrial processes aside from explosives, in which the usual nitrocellulose is useful.

It is a further object of the invention to provide a process of treating explosive, inflammable nitrocellulose to make the product provided by the invention.

To carry out the process of the invention a solution of magnesium chloride and boric acid in alcohol is first prepared, in the preferred proportion of one-half pound each of the chloride and boric acid in one gallon of alcohol. Other alcohol soluble chlorides may be substituted for magnesium chloride. It is preferred to use absolute ethyl alcohol but other common alcohols as methyl alcohol may be adopted and come within the spirit of the invention.

The nitrocellulose as received wet from the last washing to which it is subjected during its manufacture is run into a mixing tank and is saturated and thoroughly mixed with the above described solution. After thorough saturation with the solution, the material is treated by compression or centrifuge to extract substantially 70 per cent of the solvent from which the alcohol may be recovered in any usual manner.

The thus treated material is next mixed with perchlormethane in the preferred proportion of equal weights of the material and perchlormethane. After thorough mixing the perchlormethane is extracted by compression or centrifuge to leave the dry material of the invention. The perchlormethane when removed takes with it the remainder of the alcohol of the first solution.

The material thus produced is a soluble cotton which may be utilized in the arts and which may be stored and shipped dry without explosion or fire hazard.

Minor changes in the composition of the product or in the steps of the process may be made without departing from the spirit of the invention.

I claim:

The process which comprises treating nitrocellulose with an alcoholic solution of boric acid and magnesium chloride and removing the alcohol by perchlormethane.

FERNANDO SOMOZA VIVAS.